United States Patent [19]

Stastny et al.

[11] 4,061,701

[45] Dec. 6, 1977

[54] MANUFACTURE OF SOFT AND RESILIENT FOAMS

[75] Inventors: Fritz Stastny, Ludwigshafen; Rudolf Gaeth, Limburgerhof; Udo Haardt; Heinz-Hermann Koerner, both of Ludwigshafen, all of Germany

[73] Assignee: BASF Aktiengesellschaft, Ludwigshafen, Germany

[21] Appl. No.: 423,888

[22] Filed: Dec. 12, 1973

[30] Foreign Application Priority Data

Dec. 20, 1972 Germany ............................. 226225

[51] Int. Cl.² .............................................. C08J 9/00
[52] U.S. Cl. .............................. 264/51; 260/2.5 AK; 260/2.5 BE
[58] Field of Search .................. 260/2.5 AK, 2.5 BE, 260/2.5 AF; 264/51

[56] References Cited

U.S. PATENT DOCUMENTS

| 3,509,079 | 4/1970 | Hyde | 260/2.5 BE |
|---|---|---|---|
| 3,582,500 | 6/1971 | Carriere | 260/2.5 AK |
| 3,600,340 | 8/1971 | Patton | 260/2.5 BE |
| 3,608,031 | 9/1971 | Stastny | 260/2.5 BE |

*Primary Examiner*—Paul R. Michl
*Attorney, Agent, or Firm*—Keil, Thompson & Shurtleff

[57] ABSTRACT

Composite soft and resilient foams are manufactured by injecting a foamable mixture of polyisocyanates, polyols, water or inert blowing agents and, if appropriate, auxiliaries, under pressure into a mold of which about 90 to 30% of the volume is filled with foamed, soft and resilient particles of olefin polymers of particle size from about 3 to 50 mm and bulk density from 5 to 100 g/l — these particles being in loose form or fused or stuck together — and allowing the reaction mixture to foam up.

3 Claims, No Drawings

MANUFACTURE OF SOFT AND RESILIENT FOAMS

The invention relates to a process for the manufacture of composite soft and resilient foams by injecting a foamable mixture of polyisocyanates, polyols, water or inert blowing agents and, if desired, auxiliaries, into a mold which is partially filled with foamed soft and resilient olefin polymers, and allowing the reaction mixture to foam up.

It is known that rigid foam structures of adequate dimensional stability can be produced by introducing discrete particles of a porous styrene polymer and a foam-forming mixture of polyols, diisocyanates or polyisocyanates and auxiliaries, which reacts to form polyurethanes, into a mold and allowing it to foam up. It is an advantage of this process that the porous styrene polymer particles, being rigid foams, are of sufficiently high compressive strength so that they are not deformed during formation of the polyurethane foam. If instead of the rigid styrene polymer particles soft and resilient olefin polymer particles of bulk density approximately 15 g/l are used, these particles do not become homogeneously embedded in the polyurethane foam since they are deformed under the pressure of the polyurethane foam which is being produced, and as a result prevent the foamable reaction mixture from flowing in between the particles. For example, if a foamable mixture of polyisocyanates, polyols, water and additives is introduced into a mold and covered with soft and resilient foam particles it is found that the polyurethane forms in the lower part of the mold whilst the resilient foam particles are pressed against one another and against the walls of the mold. This prevents uniform distribution of the resilient foam particles in the polyurethane foam. As a result, a layer of polyurethane foam is obtained, on top of which are to be found the resilient foam particles, either loose or weakly stuck on. Similar products result if the resilient foam particles are firstly introduced into the mold and then the foamable mixture of polyisocyanate-polyol-water is run in from the top.

It has also been proposed to produce polyurethane foams from comminuted foamed polymer particles, such as foamed particles of polyurethanes, butadiene-styrene latex, polyvinyl acetate or polyvinyl chloride, and prepolymers containing isocyanate groups in the presence of water-catalyst mixtures, the said polymer particles being embedded in the foam. Foamed polymer particles which have been produced by comminuting scrap polymer as a rule have irregular and in most cases jagged surfaces. Hence, the particles readily anchor to one another to form agglomerates which it is difficult to mix homogeneously with the prepolymers containing isocyanate groups. As a result, the foamed polymer particles are extremely irregularly distributed in the moldings so that the performance of such moldings varies greatly. It is a further disadvantage that the prepolymers containing isocyanate groups, which can be used in such a process, must first be manufacture in a separate and costly process step.

German patent application No. P 21 28 684 states that composite soft and resilient foams are obtained by foaming a mixture of foamed soft and resilient particles of olefin polymers, the particles having smooth surfaces and rounded edges, and a formable mixture of polyisocyanates, polyols, water and, if desired, auxiliaries, in a mold, if one constituent of the foamable mixture is spread over the foamed soft and resilient particles, the remaining constituents of the foamable mixture are introduced into the mold, these constituents are covered with a layer of the treated soft and resilient particles and the starting materials are brought into contact with one another by turning the mold through about 180°. The composite soft and resilient foams manufactured by this process contain the foamed particles homogeneously embedded in the polyurethane foams and display good properties in practical use. However, it is a disadvantage that as a result of the foaming mold having to be turned through about 180° the manufacturing process is involved, requires expensive equipment and cannot be carried out continuously. Very large and complicated moldings can either not be manufactured at all or can only be manufactured at high cost, and with great difficulties, in small numbers.

It is an object of the present invention to provide a simple process, which does not require costly equipment, for the manufacture of composite soft and resilient foams in which resilient, soft foam particles are homogeneously embedded.

We have found that this object is achieved by foaming, in a mold, a mixture of

A. foamed soft and resilient particles of olefin polymers, of particle size from about 3 to 50 mm and bulk density from 5 to 100 g/l and B. a foamable mixture of polyisocyanates, polyols, water, catalysts and, optionally, other auxiliaries for the manufacture of polyurethane foams, if approximately 90 to 30% of the volume of the mold is filled with foamed soft and resilient plastics particles (A), either in loose form or fused or stuck together and the foamable mixture (B) is injected into the communicating cavities therby produced, under a pressure of 1.5 to 8 bars, and is allowed to foam up.

The process of the invention uses foamed soft and resilient particles (A) of olefin polymers which have a diameter from about 3 to 50 mm, preferably from 5 to 20 mm, preferably have a smooth surface and rounded edges, and possess a bulk density of 5 to 100 g/l, preferably 6 to 40 g/l and especially 10 to 20 g/l. Olefin polymers for the purposes of the invention are homopolymers and copolymers of olefins of 2 to 4 carbon atoms. Olefin homopolymers and copolymers of more than 25% X-ray crystallinity at 25° C are particularly suitable. Thus, for example, homopolymers of ethylene, propylene and butylene, or copolymers of these monomers, can be used. Copolymers of ethylene with other ethylenically unsaturated monomers, preferably containing more than about 50 percent by weight of copolymerized ethylene units, are particularly suitable for the process. Examples which may be mentioned are copolymers of ethylene with 5 to 30 percent by weight, based on the total weight of the copolymer, of esters of acrylic acid, methacrylic acid or vinylcarboxylic acid, the alcohol radical being of 1 to 6 carbon atoms. Amongst the comonomers, esters of acrylic acid with n-butanol or tert. butanol, and vinyl acetate, are of particular importance. Mixtures of olefin polymers with one another or with other polymeric compounds can also be used.

Foamed particles of olefin polymers, often referred to simply as foam particles, are particles of which the cell membrane consists of the olefin polymer. The particles are completely foamed, contain virtually no further blowing agent and can therefore not be foamed further by heating. Particles in which closed cells predominate are preferred for the process. The foamed particles are obtained by conventional industrial processes, for example by mixing olefin polymers with a blowing agent in an extruder and extruding the mixture through a die, the extrudate containing blowing agent being comminuted immediately after leaving the die and before foaming up. However, it is also possible to use particles which are obtained by heating mixture of olefin polymers and blowing agents which decompose to form gaseous products.

If the foam particles are required to possess greater heat stability it is expedient to use foamed particles of olefin polymers, especially of ethylene homopolymers and ethylene copolymers, which have a gel content of, for example, 10 to 85 percent by weight, preferably 30 to 60 percent by weight. The gel content is to be understood as the proportion by weight of the polymers which is insoluble in solvents at temperatures above the crystallite melting point. For example, in the case of olefin polymers the gel content is determined by heating the particles in toluene to 100° C, filtering and drying the insoluble constituents.

The foam particles containing a proportion of cross-linked material can be obtained by various processes. Amongst these, treating the foamed closed-cell particles with high-energy radiation has proved to be a particularly suitable method. For example the particles can be treated with X-ray beams or electron beams. A particularly suitable method of manufacture of the particles is to treat the finely divided foamed olefin polymers with electron beams at an approximate dose from 5 to 60 Mrad.

The foamed, soft and resilient particles can be introduced into the mold in loose form or preferably as agglomerates which are fused or stuck together and which contain communicating cavities. Fused agglomerates can be obtained, for example, by heating the foamed, soft and resilient particles to the softening point of the polymer and sintering together in molds under slight pressure. Preferably, the mold should be such that on heating the particles the air or other gaseous or liquid constituents can escape from the mold but the foamed particles cannot. The particles are sintered by heating to temperatures at which at least 25%, and advantageously 50 to 100%, of the original proportion of crystalline material in the polymer have melted.

Agglomerates wherein the particles are stuck together are obtained by mixing the foamed, soft and resilient particles with solvent-free curable binders such as unsaturated polyester resins, epoxide resins, polyisocyanates and polyurethane prepolymers containing isocyanate groups or hydroxyl groups and compressing the mixtures in molds by 5 to 30% of the original bulk volume. Depending on the pressure applied, fused or otherwise coherent agglomerates of foamed, soft and resilient particles of densities from approximately 20 to 120 g/l are obtained, containing greater or lesser intercommunicating cavities.

The manufacture of polyurethane foams from the polyols, water and polyisocyanates used in the present process in conjunction with the foamed soft and resilient particles of olefin polymers is known from the comprehensive literature on the subject. Amongst the larger number of starting materials used in industrial processes for the manufacture of polyurethane foams, those which usually give soft foams are preferred.

The polyols used are polyether-ols and/or polyester-ols which can be linear and/or partially branched and have molecular weights from 300 to 10,000, especially from 900 to 5,000 and preferably from 1,800 to 3,500. For example, polyether-ols produced by polyalkoxylation of dihydric or polyhydric, preferably dihydric and/or trihydric alcohols, such as ethylene glycol, propylene glycol, 1,3-butanediol, 1,4-butanediol, trimethylolpropane and glycerol, with ethylene oxide and/or propylene oxide are used. Mixtures of different polyalkylene oxides containing hydroxyl groups, for example those obtained from alcohol mixtures by the addition of ethylene oxide and/or propylene oxide, can also be used. The OH numbers of the polyether-ols are from 30 to 100 and preferably from 40 to 60.

The polyester-ols, which have OH numbers from 40 to 70, preferably from 50 to 65, are usually produced by condensation from aliphatic and/or aromatic dicarboxylic acids, such as phthalic acid and terephthalic acid and preferably from succinic acid, glutaric acid, adipic acid, pimelic acid and sebacic acid, and dialcohols and/or trialcohols, such as glycol, ethylene glycol, 1,4-butanediol, 1,3-butanediol, 1,6-hexanediol, trimethylolpropane and glycerol, at elevated temperatures and if desired in the presence of catalysts, such as titanium salts or alcoholates. Polyester-ols of acid number less than 25 are particularly suitable.

The following may be mentioned as examples of suitable polyisocyanates: aliphatic diisocyanates, such as hexamethylene-diisocyanate, 2,2,4- or 2,4,4-trimethylhexamethylenediisocyanate-1,6 or 2,2'-, 2,4'- or 4,4'-diisocyanatodicyclohexylmethane, aromatic diisocyanates such as 1,3- or 1,4-phenylenediisocyanate, 1,5-naphthaylenediisocyanate, 3,3'- or 4,4'-diphenyldiisocyanate and preferably 2,4- and/or 2,6-toluylenediisocyanate and 2,2'-, 2,4'- and/or 4,4'-diphenylmethanediisocyanate, and polyfunctional isocyanates, such as 2,4,6-toluylenetriisocyanate and polyphenylpolymethylenepolyisocyanates which are manufactured by condensation of aniline with formaldehyde in the presence of acids as catalysts, followed by phosgenation of the resulting bases. The polyisocyanates used are preferably commercially available aromatic toluylenediisocyanates and diphenylmethanediisocyanates as well as polyphenylpolymethylenepolyisocyanates. The products can be used individually or as mixtures.

The polyols or the water, and the polyisocyanates, are used in such ratios that from 0.9 to 1.1 and preferably from 1.01 to 1.05 equivalents of isocyanate groups of the polyisocyanates are present per equivalent of hydroxyl group of the polyols or per mole of water.

Carbon dioxide which results from the reaction of isocyanates with water is usually employed as the blowing agent for the manufacture of the foams. It is also possible to add to the foamable mixtures highly volatile substances which evaporate during the formation of the foam and thus increase the foaming action. Examples of such substances are halogen-substituted alkanes such as trichlorofluoromethane, dichlorodifluoromethane, acetone and ethyl acetate, and low molecular weight organic hydroxy compounds, such as methanol, ethanol or glycols.

To accelerate the reaction between the compounds containing hydroxyl groups, such as polyols and water, and the polyisocyanates, it is convenient to add to the foamable mixtures conventional catalysts, for example tertiary amines such as triethylamine, pyridine, N-methylmorpholine and preferably triethylenediamine, and metal salts, such as iron-II chloride, zinc chloride and preferably tin-II salts and dibutyl-tin dilaurate. Catalyst systems of tertiary amines and tin salts are particularly suitable.

Optionally, other auxiliaries, such as foam stabilizers, wetting agents, plasticizers, fungistatic and bacteriostatic substances, flame-retardants, dyes and fillers can also be added to the mixtures of foamed soft and resilient polymers, polyisocyanates, polyols, water and catalyst.

The ratio of the foamed, soft and resilient particles of olefin polymers (A) and the foamable mixture (B) of polyisocyanates, polyols, water and catalyst can be varied within wide limits. In general, from 20 to 100 g and preferably from 30 to 50 g of foamable mixture (B) is used per liter of foam particles (A). This gives composite soft and resilient foams which contain from 200 to 800 ml, preferably from 400 to 600 ml of embedded foamed particles of olefin polymers per liter of foam. Such composite soft and resilient foams have densities from 25 to 100 g/l, preferably from 30 to 60 g/l.

The composite soft and resilient foams are manufactured in molds. Preferably, molds of which the walls are fixed to the base, and which have a movable cover, are used. In addition, the sides of the movable cover preferably overlap the side walls of the mold. In this way it is possible, where appropriate, for the capacity of the mold to be expanded to almost twice its original volume as the foamable mixture foams up. The use of such a mold is of particular advantage if a particular increase in volume is desired, when curing the composite soft and resilient foam, so as to obtain a particular density. The molds should furthermore be so designed that on injecting the foamable mixture under pressure the air can escape but the foamed soft and resilient particles can not. It is also possible to use molds with perforated walls or molds of which the walls are fitted with 1 to 5, preferably 2 to 3, nozzles of small gauge through which the foamable mixture can be injected into the mold and, where necessary, the air can escape from the mold.

The term mold is also to be understood to include continuously operating shaping equipment, such as is used, for example, for the continuous manufacture of moldings from polyurethane foams. Such equipment consists, for example, of 4 conveyor belts so arranged relative to one another as to form a channel. The foamed soft and resilient particles are introduced into this channel at one end, the foamable mixture is injected at an appropriate distance from this end and then foamed up, and the resulting extrudate issues at the other end of the channel. The conveyor belts can also be constructed as endless belts carrying individual molds.

When carrying out the process industrially it is advisable to use molds — for example Teflon-coated molds — to the walls of which the composite soft and resilient foams do not adhere. However, it is also possible to line the molds with a thin liner, for example a smooth paper or a smooth plastic film, and thus to prevent the foam articles from adhering to the mold walls.

A suitable method of making the composite soft and resilient foams is the following:

Foamed soft and resilient particles (in loose form or as agglomerates fused or stuck together) are introduced into the mold in such amount that approximately 90 to 30%, and preferably 55 to 45%, of the volume of the mold is filled. The foamable mixture (B) of polyisocyanates, polyols, water or, optionally, inert blowing agents and other auxiliaries for the manufacture of polyurethane foams are then injected under a pressure from 1.5 to 8 bars and preferably from 1.5 to 3 bars through the nozzles into the mold, and the reaction mixture is allowed to foam up. Depending on the nature and size of the mold, the foamable mixture (B) is injected through one nozzle or simultaneously or successively through a plurality of nozzles.

According to a particularly advantageous embodiment of the process, the appropriate amount of one constituent of the foamable mixture (B) is spread over the foamed soft and resilient particles (A) of olefin polymers and the wetted particles are subsequently introduced into the mold. In this case, water is preferably used as a constituent of the foamable mixture. However, it is also possible uniformly to spread the polyisocyanate or the polyol over the foam particles. The remaining constituents of the foamable mixture (B), for example polyol, water and auxiliaries or, preferably, polyisocyanate, polyol and auxiliaries, are thoroughly mixed and the mixture is injected into the mold and thus brought into contact with the wetted foamed plastics particles.

It is surprising that using the process of the invention composite soft and elastic foams which contains homogeneously distributed embedded plastics particles, can be manufactured from loose foamed soft and resilient particles and foamable mixtures for the manufacture of polyurethane foam. Evidently, however, the foamed soft and resilient particles are fixed, and homogeneously incorporated, into the polyurethane foam under the influence of the injection pressure of the simultaneous formation of the polyurethane foam in the cavities between the plastics particles. If fused or otherwise coherent agglomerates of foamed soft and resilient particles are used it is found that the particles virtually undergo no change in position when the foamable mixture is injected into the mold through one nozzle or simultaneously through a plurality of nozzles.

Because of the homogeneous distribution of the foamed soft and resilient particles in the composite soft and resilient foams, the moldings are of uniform structure over the entire volume and hence show the same characteristics throughout. The products have high compressive strength, high shock absorbency, good resilience, high energy absorption, insulating and sound absorption capacity and a low water vapor permeability.

The composite soft and resilient foams can be used for a variety of applications. The products can be used, for example, for cushioning and lining, as sheets for sound insulation and heat insulation in buildings, as an insulating material, for example in car body work, for the production of intermediate layers in laminates, and as springy components in the manufacture of floors.

The parts specified in the Examples are by weight.

EXAMPLE 1

94 g of foamed spherical plastics particles consisting of a mixture of 66.6 parts of polyethylene of melt index 1.2 and density of 0.918 (g/cm$^3$) and 33.3 parts of a copolymer which contains 89 percent by weight of ethylene and 11 percent by weight of vinyl acetate copolymerized with one another, of approximate particle diameter 8 mm and bulk density 12 g/l, which have been uniformly wetted with a mixture of 25 g of water and 2 g of n-butanol, are loosely introduced into a mold of size 360×360×120 mm, made of 3 mm thick aluminum sheet and having a movable cover of size 363×363×70 mm which thus overlaps the side walls.

A foamable mixture consisting of 710 g of a polypropylene glycol ether of molecular weight of about 2,500 and OH number of about 55, 7 g of triethylenediamine, 7 g of dimethylcyclohexylamine, 7 g of monofluorotrichloromethane, 370 g of diphenylmethanediisocyanate and 100 g of methylene chloride is progressively injected, under pressure of 2 bars, into the mold through 4 nozzles of 10 mm diameter which are mounted in the cover in the form of a square of side length 100 mm.

After 40 minutes, the molding is released from the mold. A composite soft and resilient polyurethane foam of density 53 g/l is obtained, in which the foamed soft and resilient particles are homogeneously embedded. The composite soft and resilient foam is suitable for use as a shock-absorbing cushioning material and as an intermediate layer for the application of pressure.

EXAMPLE 2

9 sheets of size 330×330×20 mm, of density 19.5 g/l, in which the proportion of cavities between the loosely fused particles of foamed polyethylene amounts to 48 percent by volume, are wetted with a mixture of 30 g of water and 2 g of n-butanol and stacked over one another in a mold such as described in Example 1. A foamable mixture prepared analogously to the data in Example 1 is progressively injected under a pressure of 2.5 bars into the closed mold through the 4 nozzles on the cover.

After 50 minutes the molding is released from the mold. A composite soft and resilient foam of density 69 g/l is obtained, in which the cavities originally present between the fused foamed polyethylene particles have been filled with polyurethane foam.

The increase in the density of the composite soft and resilient foam also results in an increase in the energy-absorbing efficiency of the product. The process is particularly suitable for filling cavities with a reinforcing structure of polyurethane foams, for example in seat cushions and bumpers of vehicles, or for filling interspaces in building elements.

EXAMPLE 3

A polyethylene foam block of size 330×330×180 mm, of bulk density 16 g/l, which has been produced by fusing together foamed spherical polyethylene particles of diameter 18 mm with an adhesive mixture of 25 parts of a polyester-ol from adipic acid and diethylene glycol, of molecular weight approximately 2,000 and OH number approximately 40, 1.2 parts of castor oil, 7.5 parts of 4,4'-diphenylmethanediisocyanate, 2.5 parts of ethyl acetate and 0.25 part of tin dioctoate is wetted with a mixture of 30 g of water and 2 g of n-butanol and introduced into a mold such as is described in Example 1. A foamable mixture which has been prepared analogously to the data of Example 1 is progressively injected under a pressure of 2.5 bars into the closed mold through 4 nozzles on the cover.

After 50 minutes, the molding is released from the mold. A composite soft and resilient molding of density 51 g/l is obtained, which contains foamed polyethylene particles partially fused together, and in which the cavities between the particles are filled with polyurethane foam. The molding possesses high resilience, is homogeneous in appearance, and can be cut readily. It can be used as a cushioning material or as a filler in gym mats.

We claim:
1. A process for the manufacture of composite soft and resilient foams by foaming, in a mold, a mixture of
    A. foamed soft and resilient particles of olefin polymers selected from the group consisting of homopolymers of ethylene, propylene, butylene and copolymers of ethylene with other ethylenically unsaturated monomers containing more than about 50 percent by weight of copolymerized ethylene units, having more than 25% X-ray crystallinity at 25° C, of particle size from about 3 to 50 mm and bulk density from 5 to 100 g/l and
    B. a foamable mixture of polyisocyanates, polyols, water, catalysts and, optionally, other auxiliaries for the manufacture of polyurethane foams,
wherein approximately 90 to 30% of the volume of the mold is filled with foamed soft and resilient particles (A), either in loose form or as agglomerates fused or stuck together and the foamable mixture (B) is injected into the communicating cavities thereby produced, under a pressure of 1.5 to 8 bars, and is allowed to foam up.

2. A process as set forth in claim 1 wherein said particles have a diameter of from 5 to 20 mm and wherein said particles have a bulk density of 6 to 40 g/l.

3. A process as set forth in claim 1 wherein at least one of the components of the foamable mixture (B) is spread over particles (a) to wet said particles and thereafter the remaining components of the foamable mixture (B) are injected into the mold and brought into contact with said wetted particles.

* * * * *

UNITED STATES PATENT AND TRADEMARK OFFICE
CERTIFICATE OF CORRECTION

PATENT NO. : 4,061,701

DATED : December 6, 1977

INVENTOR(S) : Fritz Stastny et al

It is certified that error appears in the above-identified patent and that said Letters Patent are hereby corrected as shown below:

First page, left-hand column, line 12 should read:
   --Dec. 20, 1972   Germany . . . . 2262250--.

Column 8, line 44, "(a)" should read --(A)--.

Signed and Sealed this

Fifteenth Day of August 1978

[SEAL]

Attest:

RUTH C. MASON
Attesting Officer

DONALD W. BANNER
Commissioner of Patents and Trademarks